United States Patent
Beresniewicz

(10) Patent No.: US 8,051,486 B2
(45) Date of Patent: Nov. 1, 2011

(54) INDICATING SQL INJECTION ATTACK VULNERABILITY WITH A STORED VALUE

(75) Inventor: John M. Beresniewicz, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1079 days.

(21) Appl. No.: 11/807,010

(22) Filed: May 24, 2007

(65) Prior Publication Data

US 2008/0295178 A1 Nov. 27, 2008

(51) Int. Cl.
G06F 11/00 (2006.01)
(52) U.S. Cl. ............................................ 726/25; 726/22
(58) Field of Classification Search .................. 726/22, 726/25; 713/188; 707/610, 702, 705, 790, 707/792
See application file for complete search history.

(56) References Cited

U.S. PATENT DOCUMENTS

| | | | |
|---|---|---|---|
| 5,875,334 A | 2/1999 | Chow et al. | |
| 5,987,455 A | 11/1999 | Cochrane et al. | |
| 7,444,331 B1 | 10/2008 | Nachenberg et al. | |
| 7,568,229 B1 | 7/2009 | Nachenberg et al. | |
| 7,593,974 B2 * | 9/2009 | Suzuki et al. | 1/1 |
| 7,702,642 B1 | 4/2010 | Wolfman et al. | |
| 7,860,842 B2 | 12/2010 | Bronnikov et al. | |
| 2003/0093410 A1 | 5/2003 | Couch et al. | |
| 2005/0027981 A1 | 2/2005 | Baum-Waidner et al. | |
| 2005/0055565 A1 | 3/2005 | Fournet et al. | |
| 2005/0203921 A1 | 9/2005 | Newman et al. | |
| 2006/0031933 A1 | 2/2006 | Costa et al. | |
| 2007/0156644 A1 * | 7/2007 | Johnson et al. | 707/2 |

OTHER PUBLICATIONS

Litwin, Paul, "Data Security Stop SQL Injection Attacks Before They Stop You", Microsoft Corporation, MSDN Magazine, 2007, retrieved from website: <http://msdn.microsoft.com/msdnmag/issues/04/09/SQLInjection/>, 8 pages.
Huang, Y. et al., "Securing Web Application Code by Static Analysis and Runtime Protection" *WWW* (2004) pp. 40-52.
Wasserman, G. et al., "Sound and Precise Analysis of Web Applications for Injection Vulnerabilities" (Jun. 2007) *ACM*, 10 pages.
Boyd et al., "Preventing SQL Injection Attacks", SQLrand ACNS 2004, LNCS 3089, pp. 292-302.

(Continued)

*Primary Examiner* — Eleni Shiferaw
*Assistant Examiner* — Ali S Abyaneh
(74) *Attorney, Agent, or Firm* — Hickman Palermo Truong & Becker LLP

(57) ABSTRACT

A web application receives a user input with a SQL injection attack string that references a function. The application generates a corresponding statement based on the user input string, which the application sends to a database server. Upon receiving the statement, the database server executes the statement that invokes the referenced function. When invoked, the referenced function stores a value. The presence of the stored value indicates that the database server invoked the function. Storing the value indicative of the function invocation identifies a vulnerability of the web application to SQL injection attacks, since the function reference is introduced solely through user input and function invocation is not intended by the application. This provides proof of SQL injection vulnerability of the application.

20 Claims, 5 Drawing Sheets

OTHER PUBLICATIONS

Dogru et al, "A Graphical Data Flow Language for Retrieval, Analysis, and Visualization of Scientific Database.", Journal of Visual languages and computing (1996) pp. 247-265.

Liu, "Architectures for intrusion tolerant database system", Proceeding of the 18th annual computer security application conference, School of Information Science and Technology, Pennsylvania State, (ACSAC 2002), 10 pages.

Gould et al., "Static Checking of Dynamically Generated Queries in Database Applications", Proceeding of the 26th International Conference on Software Engineering, Department of Science University of California Davis, (ICSE 2004).10 pages.

Lubomir et al., AGM: "A Dataflow Database Machine", University of California Irvine, vol. 14, No. 1, Mar. 1989, pp. 114-146.

* cited by examiner

INDICATING SQL INJECTION ATTACK VULNERABILITY WITH A STORED VALUE

TECHNOLOGY

The present invention relates generally to information security. More specifically, embodiments of the present invention relate to indicating application vulnerability to SQL injection attacks with a stored value.

BACKGROUND

Information is conveniently stored in repositories such as databases. Various applications access and use the information stored in such databases. The value and importance of information to modern enterprises cannot be overstated. Efforts to secure information comprise a serious modern endeavor and database security is a major concern. However, databases and the applications that access information therein have become targets for malicious attacks such as "hacking," which can compromise information by destruction, damage and/or misappropriation of data. Unfortunately, a large and developing array of attack techniques and modalities exist.

When a user of a client browser makes an input to a web application, the web application may generate one or more statements containing SQL (Structured Query Language), PL/SQL (Procedural Language/SQL) code or the like that proffers a query to a database. A database server accesses the information from the database and returns information to the web application, which returns the information to the client. The client browser then displays or otherwise presents the requested information to the user. It is noteworthy that the information queried from the database and presented to the user typically depends on the user input in that different input values may result in different information returned.

Modern, well-crafted, robust web applications are typically designed and configured to resist attacks from hackers, whose attacks may be aimed to corrupt, damage, destroy, and/or compromise information stored in a database. However, not all web applications in use are modern, robust or well crafted. Older web applications are still in use. Some older applications were designed and configured without regard to attack modalities that did not exist or which were not well known or especially troublesome at the time the web application was deployed.

Further, some more modern web applications may lack one or more features that would otherwise harden the applications against attack. For instance, applications prepared in ad hoc efforts, inartfully or amateurishly, and those developed under time constraints or low budgets, may be particularly vulnerable in this sense. Moreover, even modern, robust and well-crafted web applications may suffer design flaws and configuration errors, which can leave the applications vulnerable in similar ways.

Stored information can be corrupted or damaged by a hacker making unauthorized, typically incorrect, random, or nonsensical changes to stored data values or similarly flawed entries to data fields. Stored information can be destroyed by a hacker deleting tables, object classes or rows and objects contained respectively therein. Stored information can be compromised by a hacker gaining unauthorized access to data that are supposed to be confidential, private, and protected from disclosure.

Such attacks take many forms, but one particular attack modality that has been used successfully by hackers is the so-called SQL injection attack.

An instance of a more general class of vulnerabilities that can arise where a scripting or programming language is embedded within another language, SQL injection refers to a class of security related vulnerabilities in the data access layer of an application. Successful SQL injection allows hackers to execute queries in SQL, PL/SQL or the like, which are unintended by the application and allow the hacker unauthorized access to stored data.

SQL injection attacks are typically launched using cleverly modified input strings to the application. A vulnerable application is compromised by manipulative exploitation of these relatively simple, but potentially pernicious, strings. SQL injection vulnerability is associated with inadequate filtering of input strings for string literal escape characters combined with the (full or partial) inclusion of those input strings in SQL statements proffered to the database, resulting in the unexpected execution of SQL that is modified with user input that is not strongly typed.

Client/Server/Database Operation

For instance, many modern web applications function with a three-tier configuration. Web applications frequently comprise a layer of Java or related code that is hosted by a middle tier web application server. Web applications receive inputs from web browsers, which are hosted by front-end tier client computers. In response to a browser request for a particular web page or other document, a web application accesses or retrieves the document and returns the document to the browser, which renders the webpage and displays the page at the client.

Frequently, information that the web application accesses and passes back to the browser associated with the document is stored in a relational or other database in a back-end tier, from which the information is retrieved. The database accesses the information by executing a statement in SQL or similar database query language. The database tier returns the information to the web application, which may format or otherwise process the information before sending it to the browser for display. Under some circumstances, the web application accepts input from the browser and, upon processing the input, uses some or all of the input to transform or modify the SQL query proffered to the database. For simplicity and brevity of explanation, the term SQL will be used herein, although it should be understood that references herein to SQL are examples that are intended to refer to PL/SQL and other database languages.

Information exchange in this three-tier environment may be explained with the following example. Using a client browser, the user opens a webpage associated with a hypothetical book-vending enterprise, "http://www.bookelephant.com," and uses a search feature associated therewith to find books by a certain author, such as "Beresniewicz." A web server may be associated with "www.bookelephant.com." The web server may host a web application associated with the enterprise. The search feature may include a data entry field displayed by the browser as the webpage is rendered. The browser accepts textual user inputs therewith. The webpage sends the inputs to the web application encoded as XML (Extensible Markup Language) or similar data transfer encoding. Upon receipt of the input from the browser, the web application transforms the encoded input:

Books/Beresniewicz/Search
into a SQL statement. For instance, the example encoded input above may be transformed into a SQL query as shown below:

```
select   titles
from     books
where    author = 'Beresniewicz';
```

The "single quote" (i.e., apostrophe) marks around the input data "Beresniewicz" in the query denote that this query token is a string literal. The web application places these single quote marks around the input data ("Beresniewicz") as part of transforming the input into the SQL statement proffered to the database. From one or more databases associated with "www.bookelephant.com," the titles of books that are stored therein are retrieved in response to the query and supplied to the web application. The web application returns the titles to the browser in HTML (Hypertext Markup Language) or similar code. The browser renders the HTML with a new or revised webpage. The browser displays the webpage for the user. However, the way the web application transforms user-entered request inputs into SQL queries in this example leaves the web application vulnerable to a SQL injection attack.

SQL Injection Attacks

SQL injection attacks target the web application's transformation of all or part of user request inputs (e.g., search query terms) into SQL database queries. A hacker's clever manipulation and use of various strings in inputs to a web application can cause the web application's transformation thereof to generate queries that are not intended by the web application. When executed by a database server, such queries can return data that the hacker lacks authorization to access. The hacker essentially exploits the transform to execute potentially pernicious and/or nefarious SQL statements.

A hacker can exploit the query structure resulting from the web application's transform of the user input. For example, a hacker may modify the author's name "Beresniewicz" to read as shown below.

Beresniewicz'||' union select password from security_table
In this example, the hacker cleverly inserts the single quote mark followed by the concatenation symbol (||), followed by another single quote mark and the phrase "union select password from security_table." Unfortunately, upon receiving and processing this input, the vulnerable web application transforms this input request into a SQL statement that includes a pernicious and unintended query such as the example shown below.

```
select   titles
from     books
where    author = 'Beresniewicz'
union
select   password
from     security_table;
```

What the hacker has accomplished here is to "inject" SQL code within the browser input that was sent to the vulnerable web application. This injected SQL essentially "tricks" the web application into generating a SQL query that the web application is not intended to generate. The "trick" exploits the fact that the application simply concatenates single quotes around the input data and appends the resulting string literal token to the SQL statement without further validation of the input data. Such simplistic transformations of input data into SQL statements are unfortunately a common form of SQL injection vulnerability. Ominously in this example, SQL injection enables the hacker to access private passwords (e.g., of other users) from a security table in the database being queried. This is private, sensitive, and potentially damaging information to which the hacker is not entitled. Moreover, there is possibly no evidence that the sensitive, private data has been compromised. This dearth of evidence that the attack has occurred can be equally ominous.

Detecting Vulnerable Applications

In the example above, the SQL injection attack string was added to the end of valid input ("Beresniewicz"). However, other SQL strings can be injected at other parts of the input, as well. It is appreciated that not every such injection attack will allow successful access to unauthorized data sought by the hacker. Frequently (perhaps more often than not) a hacker will receive an "Error" message in response to a particular input. The hacker may essentially have to guess at the workings of a suspected vulnerable web application, specifically to determine how input data is transformed into SQL statements and whether these transforms can be exploited by injection attacks. From parsing some such error statements generated by one or more input attack strings and strategies, however, the hacker may glean clues for refining the injection attack. In this way, the hacker may eventually succeed. A successful SQL injection attack is called an exploit.

Various efforts are made to harden modern web applications against such attacks and to prevent vulnerabilities to exploits. For instance, more informed or sophisticated application programs may require statements to associate user input data with bind variables in SQL statements, which prevents unintended SQL statements from being injected with queries as input data does not transform the resulting query. As discussed above however, not all of the millions of existing web applications are so hardened.

Furthermore, detecting vulnerabilities in web applications poses a number of challenges. Confirming the vulnerability of a particular web application can involve interpretation of webpage response information that is very specific to the application. This can be difficult to automate and error prone as error messages can vary widely from application to application and even within an application from input to input. Large web applications can be associated with large numbers of web pages. Testing such large applications for SQL injection vulnerability can therefore be tedious, error prone, time consuming and expensive. Moreover, web pages may respond in variable ways, depending upon the particular inputs they may receive. Current techniques exist that automate SQL injection vulnerability testing from the input side (e.g., by automatically injecting common attack strings for data inputs at the front end). However, the variability in page response possibilities means that it is difficult to ascertain with these techniques, under all possible input circumstances, whether SQL injection vulnerability exists or not.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Based on the foregoing, it could be useful to reduce the tedium, error probability and time and expense involved in detecting SQL injection vulnerability in web applications.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to detecting and proving SQL injection attack vulnerability based on the presence of values that attack-invoked functions store in a database. A web application receives a user input that references a function and generates a corresponding statement (e.g., a SQL query). The application sends the statement to a database server for execution. If executed, the referenced function stores a value. The presence of the stored value indicates that the database server invoked the function. Execution of the function constitutes execution of injected SQL, therefore presence of the stored value is proof of the vulnerability.

In an embodiment, a database server receives a statement from a middle tier application. The statement references a function which, when executed, stores a value. The function is invoked and the value is stored. The presence of the stored value indicates that the function was invoked and comprises an audit record of a vulnerability of the middle tier application to SQL injection attack.

The example embodiments described herein detect and identify security vulnerability in applications that access databases and related information repositories, such as vulnerability to SQL injection and related attack modes. Moreover, the example embodiments achieve the foregoing with reduced tedium, error probability, time and expense in comparison with prior approaches.

Example Computing Environment and Data Flow

Figure 1A:
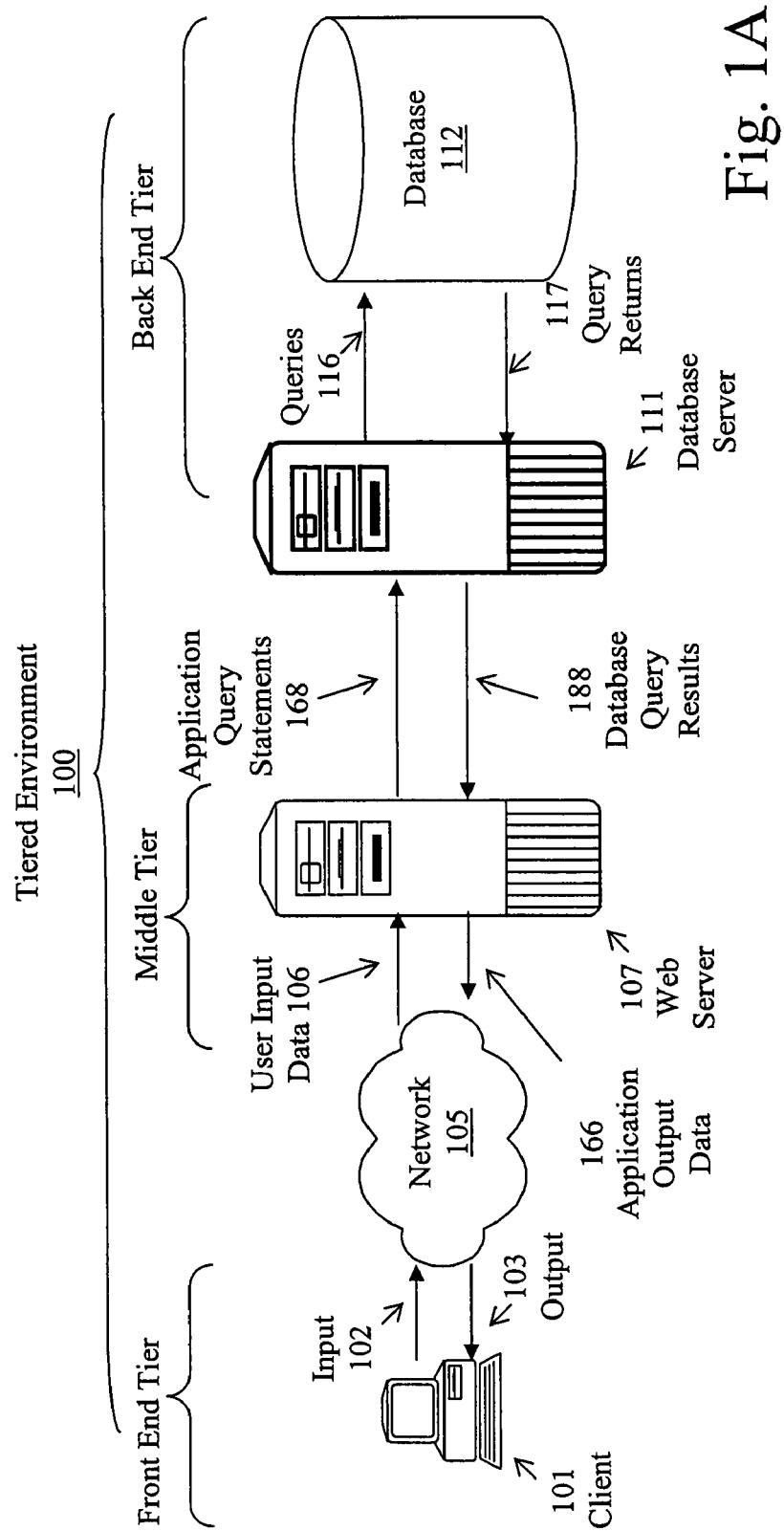
FIGS. 1A and 1B depict an example tiered computing environment, according to an embodiment of the invention.
Figure 1B:
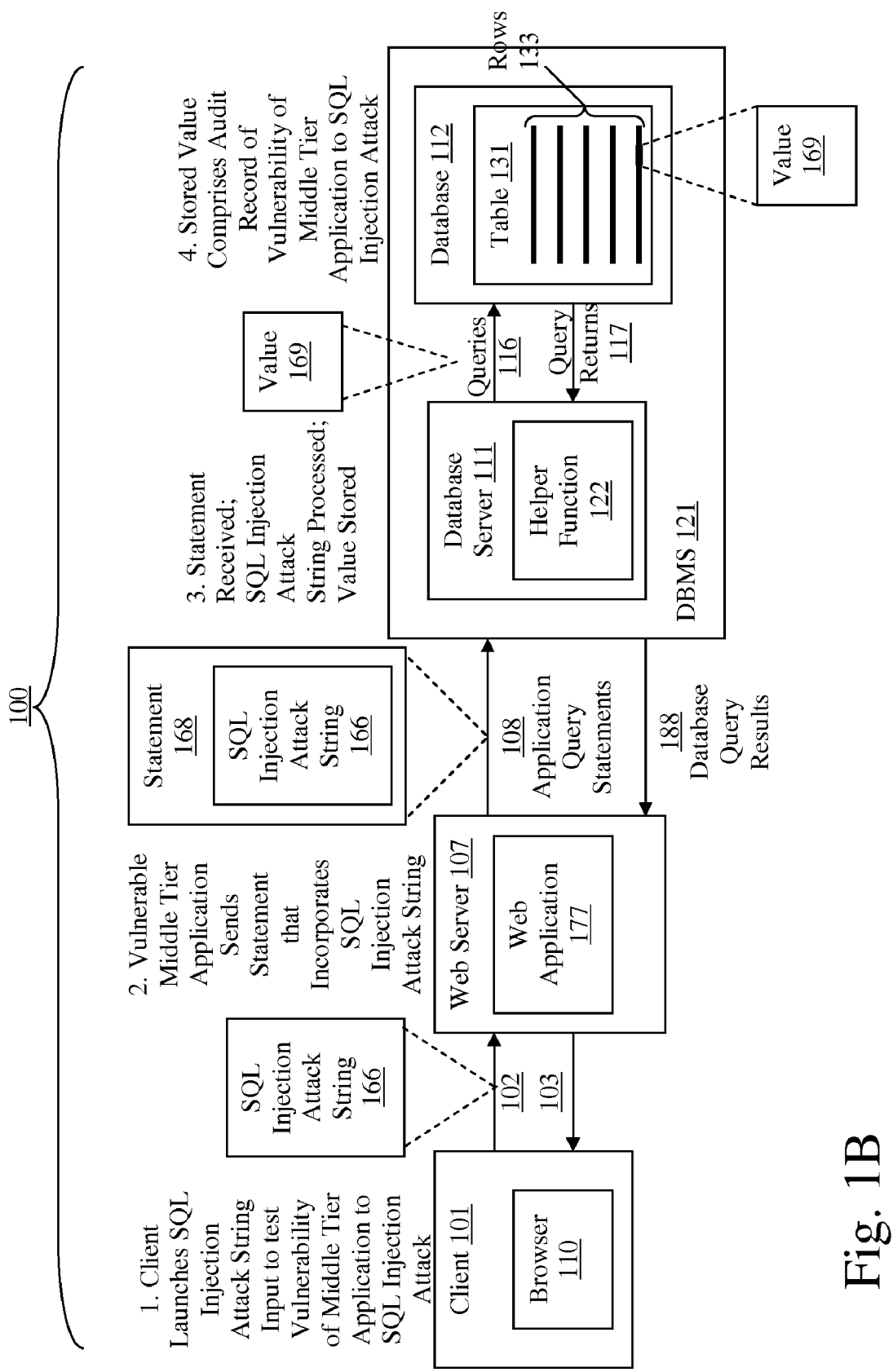

FIGS. 1A and 1B depict an example multiple tier computing environment 100, according to an embodiment of the invention. While three tiers are used for explanatory purposes herein as an example environment, embodiments of the present invention are well suited to function in environments that have two or more tiers, e.g., including multiple or multi-stage middle tiers, in which a database and an associated database server comprise a back end tier.

A client computer 101 is coupled with a network 105 in a first or "front end" tier. Client 101 makes inputs 102 to, and receives outputs 103 from, a web server 107 via network 105 in a second or "middle" tier. Database 112 is deployed in storage media, which may be a component of or proximate to database server 111. Database 112 may also be coupled via a network with the database server 111 and may be disposed in a storage area network (SAN), network area storage (NAS), a data warehouse or other mass storage functionality.

Client 101 features a browser 110 and sends inputs 102 to web server 107. Browser 110 also processes outputs 103 upon their return from the middle tier and further functions to display information related thereto. Web server 107 hosts web application 177 and receives inputs 102 from client 101. Upon processing inputs 102, web application 177 provides outputs 103 to client 101.

An input 102 to web server 107 may request information that is stored in the database 112. Database server 111 hosts one or more web applications 177. Web applications 177 may comprise code such as Java or another programming language. To obtain the information requested in input 102, web application 177 generates application query statements 108, which include a statement 168. Statement 168 may include a request for the information. Web application 177 sends the statement 168 to database server 107 with application data 108.

Upon receiving and processing statement 168, the database server 111 submits a corresponding query 116 to, and receives corresponding query returns 117 from, a database 112 in a third or "back end" tier. Database server returns the query results, with the information requested by input 102, to web application 177 via database query results 188.

Database server 111 functions with database 112 in a database management system (DBMS) 121. Database server 111 stores data in one or more data containers, each of which contains records. The data within each record is organized into one or more fields. Where database 112 functions as a relational database, the data containers therein comprise table 131. The records stored in table 131 comprise rows 133. Database 112 can contain virtually any number of tables, the attributes of which are contained in columns. Other database architectures may be used in various embodiments.

With reference more particularly to FIG. 1B, browser 110 allows client 101 to send a SQL injection attack string 166 (described below) with input 102 to web server 107 for web application 177. Upon receiving input 102 and processing SQL injection attack string 166 therein, the web application 177 generates statement 168 for transmission with application data 108 to database server 107. Statement 168 incorporates the SQL injection attack string 166.

Upon receiving statement 168, database server 111 may or may not process SQL injection attack string 166. Upon processing SQL injection attack string 166, database server 111 invokes a helper function 122. Helper function 122 stores a value when invoked. Value 169 is written to one of the rows 133 of table 131.

The presence of value 169 in one of the rows 133 indicates:

(A) that helper function 122 was invoked; which in turn indicates:

(B) that web application 177 is vulnerable to SQL injection attack.

These indications follow, because:

(1) value 169 would only appear in a row 133 of table 131 if the helper function 122 was invoked;

(2) helper function 122 would be invoked only if statement 168 contained and executed the SQL injection attack string 166;

(3) execution of the SQL injection attack string is by definition successful SQL injection attack (4) statement 168 would contain SQL injection attack string 166 only if attack string 166 were inserted therein by web application 177; and (5) web application 177, upon receiving input 102 and processing SQL injection attack string 166 therein, would only incorporate SQL injection attack string 166 into statement 168 if web application 177 were vulnerable to SQL injection attack.

Therefore, an embodiment allows the presence of stored value 169 in database 112 to function as a record of the invocation of helper function 122 and the vulnerability of web application 177 to attack by the SQL injection modality. Such an embodiment thus allows the presence of stored value 169 in database 112 to be reported as, for instance, an audit record. Correction of the vulnerability thus detected may involve, for instance, changing the application code to remove the vulnerability.

In an embodiment, SQL injection attack string 166 comprises a reference to function 122. Any of a variety of SQL injection attack string formats may be used to formulate attack string 166; in one embodiment, attack string 166 uniquely references function 122. Thus, to test the book search input webpage associated with the web application of the previously discussed hypothetical book vendor, an example attack string may be input to the web application as shown below.

Books/Beresniewicz'||'FOO||'/Search

The web application, if vulnerable to SQL injection attacks, will transform this input into a SQL statement, such as the example query:

```
selecttitles
from books
where author = Beresniewicz' | |FOO| | '' ;
```

Which when executed, invokes the function 'FOO'. Upon invocation, the function FOO stores a value in (e.g., writes a row to a table of) database 112 to serve as a record of the function's invocation.

Several helper functions, represented herein by helper function 122, may be stored with the database server 111. In an embodiment, a first helper function "FOO" returns character data and a second helper function "FOO0" (read, "FOO Zero") returns numeric data. In an embodiment FOO returns a null (or empty) character (e.g., ' ') string when invoked. In an embodiment FOO0 returns the numeric value zero (0) when invoked. In one embodiment therefore, actual values (e.g., ' 'and 0, respectively) are returned when either FOO or FOO0 is invoked; no error message is returned. When invoked in attack strings the functions essentially operate "silently" in that the return values null (empty string) and zero have negligible effect on the input data. In the example, the attack input string is resolved into a valid input string after invocation of the function FOO as follows: 'Beresniewicz'||FOO||'' becomes 'Beresniewicz'||''||'' which becomes simply 'Beresniewicz'. The function FOO executed and returned null which was concatenated to the valid string yielding back the valid string. In this embodiment the function both records the injection vulnerability and disappears from the input string when executed as part of the SQL statement. Thus, an embodiment of the present invention allows testing and detection of a web application's SQL injection vulnerability without interrupting or curtailing the operability of the web pages associated therewith, that is without inducing application errors for interpretation An embodiment functions within the context of a database session, which essentially functions an active proxy of a user who is working with the database. Invoking function 122 results in writing value 169 to database 112. Writing value 169 to database 112 forms an audit record of the SQL injection vulnerability of web application 177, which invoked function 122. In this embodiment the functions FOO and FOO0 may write any number of useful pieces of information to the audit record, including various data retrieved from an in-memory table of session data, an input identifier, a timestamp, etc.

The signature of function 122 relates to how function 122 is called or the protocol for invoking function 122, e.g., with an associated application program interface (API), etc. and that which function 122 returns when invoked. By accepting and logging input numeric identifiers into the audit record, the helper functions in an embodiment allow user-definable mappings of rows 133 in an audit table 131 to specific SQL injection tests performed for any number of tested web applications and thus, to identify vulnerabilities input field by input field and web application-by-web application.

SQL injection testing using an embodiment may be implemented manually. However, an embodiment may be implemented with SQL injection test strings incorporated with a web crawler or other mechanism to automate SQL injection testing therewith.

Example Processes

Figure 2:
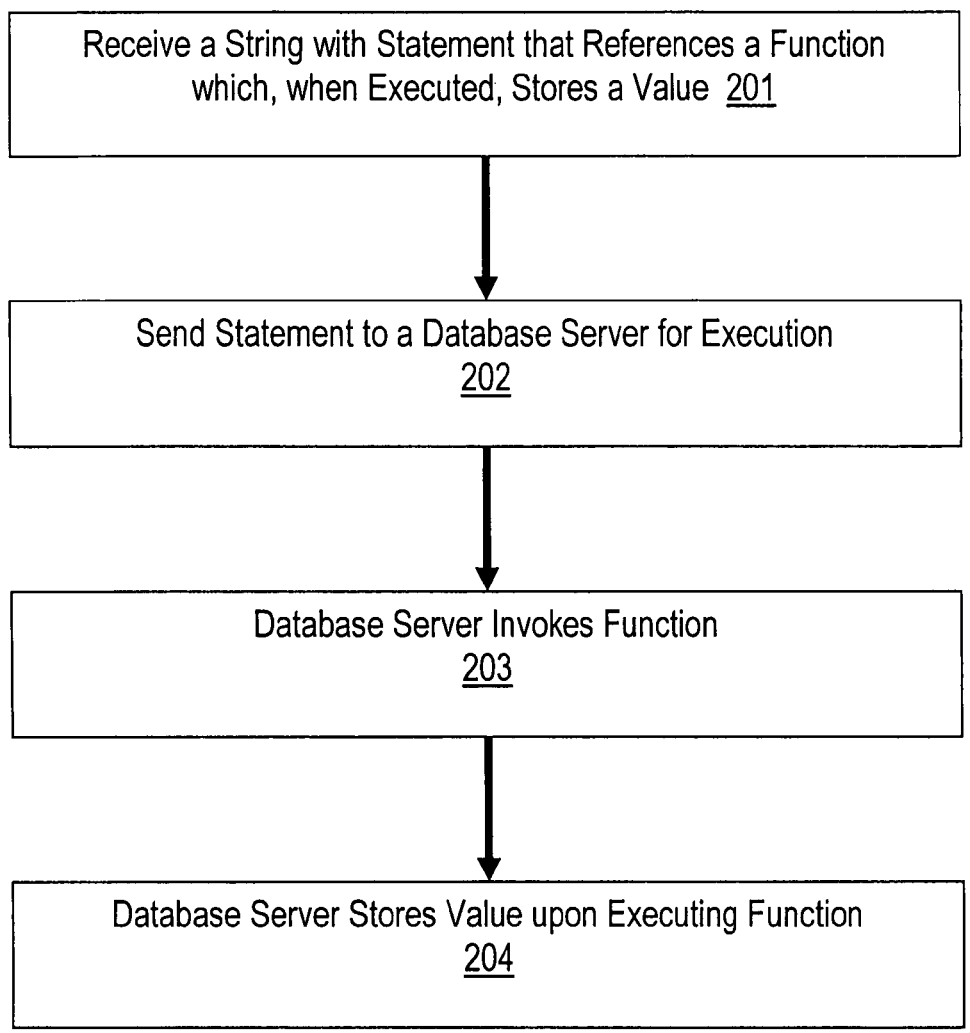
FIG. 2 depicts an example process, according to an embodiment of the invention.

FIG. 2 depicts an example process 200, according to an embodiment of the invention. Process 200 initially executes in a web server such as web server 107 (FIGS. 1A, 1B). In block 201, a string value is received with a statement. The string references a function which, when executed, stores a value, e.g., in a repository such as a database. In an embodiment, the statement and the string-embedded function reference are rendered in a database language such as SQL, PL/SQL, or a database language that performs one or more functions characteristic of SQL or PL/SQL. An embodiment also functions with one or more proprietary or specialized database languages.

In block 202, the statement is sent to a database server for execution. In block 203, the function is invoked if the statement including the string can be executed by the database server. For instance, the function may be invoked upon processing the string. In an embodiment, the function is stored within the database or the database server and made publicly accessible.

Upon the database server executing the function, the value is stored in block 204. In an embodiment, the value is stored in a database associated with the database server. Where the database is a relational database, the value is stored as a row, written to a table of the database. The presence of the stored value indicates that the function was invoked.

Figure 3:
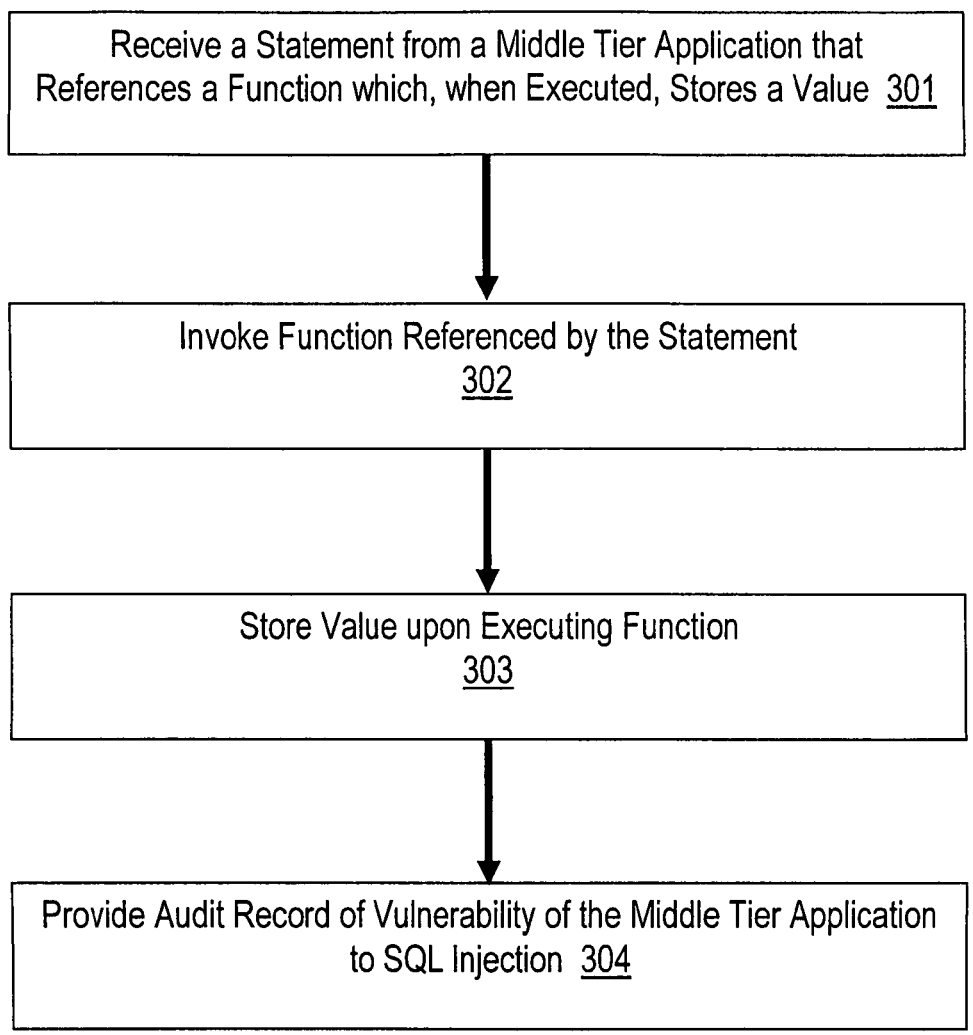
FIG. 3 depicts another example process, according to an embodiment of the invention.

An embodiment may be implemented in a computing environment of three or more tiers, in which the database is occupies an end tier. In this environment, an application executing in a middle tier thereof sends the statement to the database server. The stored record comprises an auditable record of a vulnerability of the middle tier application to SQL injection or a similar attack modality. In an embodiment, the string that is received with the statement comprises a SQL injection attack string FIG. 3 depicts another example process 300, according to an embodiment of the invention. Process 300 initially executes in a database server such as database server 111 (FIGS. 1A, 1B). In block 301, a statement is received from an application executing in a middle tier of a multi-tiered computing environment. The statement references a function which, when executed, stores a value. The statement may be received by a database server, with which the function may be stored, in an end tier of the multi-tiered computing environment. The statement may be rendered in a database language such as SQL, PL/SQL or the like.

In block 302, the function referenced by the statement is invoked. For instance, the statement may contain a string such as a SQL attack string, which may be processed by the database server to invoke the function. Upon invoking the function, the value is stored in block 303. The value may be stored in a database associated with the database server. For instance, the value may be written to a row in a table stored within a relational database.

The invocation of the function is indicated based on the presence of the stored value. In block 304, the stored value may be provided as an audit record of a vulnerability of the middle tier application to SQL injection attacks.

In various embodiments, processes 200 and 300 may be automated and may be performed by one or more processors in one or more computer systems, executing logic encoded with one or more computer readable media. The actions enumerated with reference to processes 200 and 300 need not all be performed in the order shown. Embodiments of the present invention are well suited to function with the enumerated actions performed in an order other than that shown. Further, the actions enumerated with reference to processes 200 and 300 need not all be performed in all embodiments and some embodiments perform actions in addition to those enumerated.

Example Computer System Platform

Figure 4:
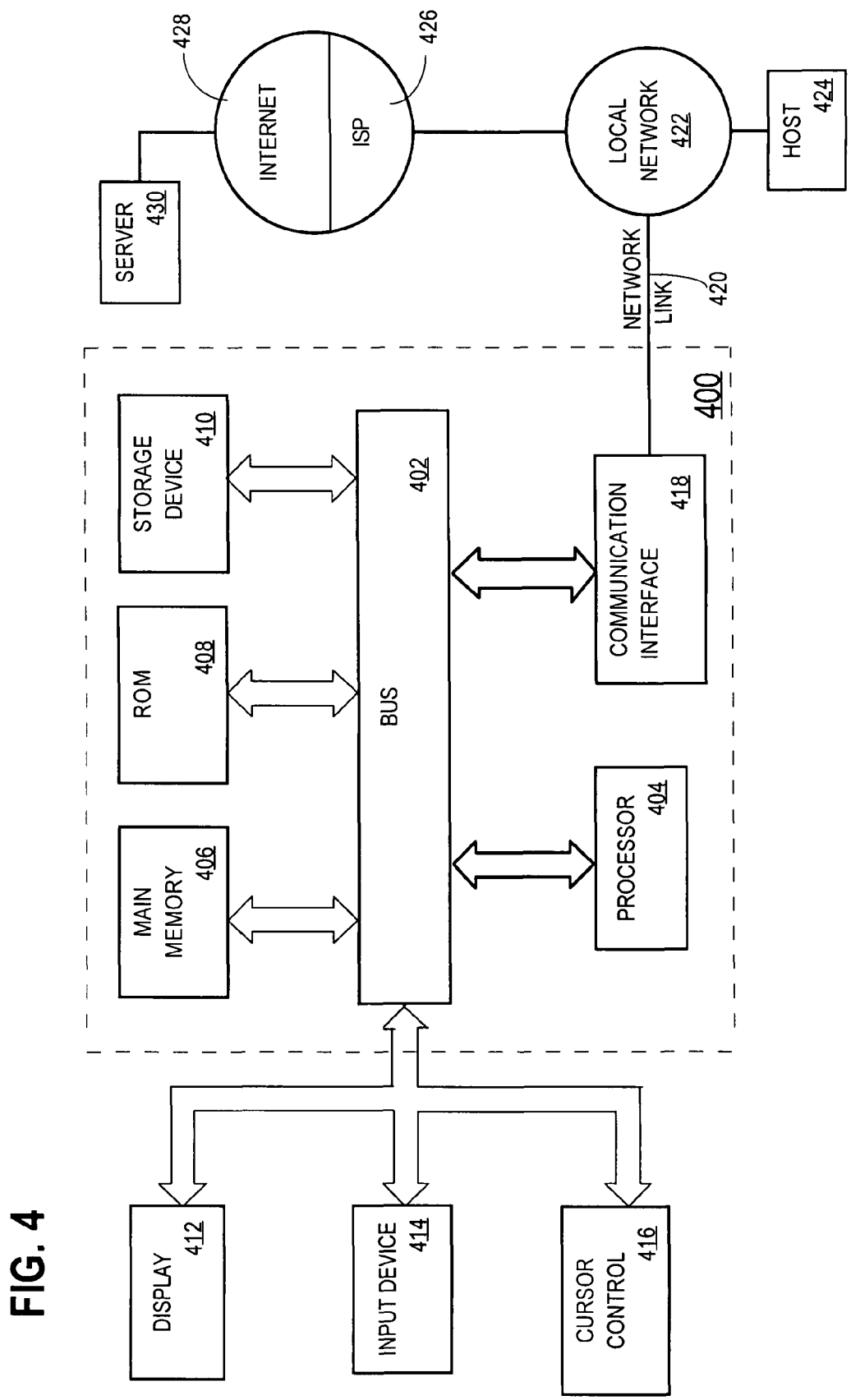
FIG. 4 depicts an example computer system platform, with which an embodiment of the present invention may be practiced.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), cathode ray tube (CRT) or the like, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for indicating function invocation with a stored value. According to one embodiment of the invention, indicating function invocation with a stored value is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and other conductors and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a digital subscriber line (DSL), cable or other modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for indicating function invocation with a stored value as described herein.

The received code may be executed by processor 404 as it is received, and/or stored in storage device 410, or other non-volatile storage for later execution. In this manner, computer system 400 may obtain application code in the form of a carrier wave.

Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   receiving a statement that contains an application input string that references a function which, when executed, stores a particular value; and
   wherein the application input string comprises a string literal specified by a user of an application, followed by a concatenation symbol, followed by the function;
   sending the statement to a database server for execution;
   wherein the presence of the stored particular value indicates that the database server invoked the function;
   wherein the invocation of the function indicates that the application is vulnerable to Structured Query Language (SQL) injection attack;
   wherein the method is performed by one or more computing devices.

2. The method as recited in claim 1 wherein the particular value is stored, upon the database server invoking the function, in a database associated with the database server.

3. The method as recited in claim 2 wherein the particular value is stored as a row written to a table of the database.

4. The method as recited in claim 2 wherein the function is disposed within the database or the database server.

5. The method as recited in claim 2 wherein the database comprises an end tier of an application computing environment that has two or more tiers and wherein the sending of the statement to the database server is performed by an application executing from a tier of the computing environment other than the database.

6. The method as recited in claim 1 wherein the function is invoked upon processing the application input string.

7. The method as recited in claim 1 wherein the statement comprises a statement in Structured Query Language (SQL), Procedural Language/SQL (PL/SQL), or a database language that performs one or more functions of SQL or PL/SQL.

8. The method as recited in claim 1 wherein the particular value comprises an audit record of a vulnerability of the application to SQL injection.

9. The method as recited in claim 1 wherein the application input string comprises a SQL injection attack string.

10. The method of claim 1, wherein the function, when executed, returns a null value to the application.

11. A non-transitory computer-readable storage medium having instructions encoded therewith which, when executed with one or more processors of a computer system, cause the processors to execute a method comprising:
    receiving a statement that contains an application input string that references a function which, when executed, stores a particular value; and
    wherein the application input string comprises a string literal specified by a user of an application, followed by a concatenation symbol, followed by the function;
    sending the statement to a database server for execution;
    wherein the presence of the stored particular value indicates that the database server invoked the function;
    wherein the invocation of the function indicates that the application is vulnerable to Structured Query Language (SQL) injection attack;
    wherein the method is performed by one or more computing devices.

12. The non-transitory computer-readable storage medium of claim 11, wherein the particular value is stored, upon the database server invoking the function, in a database associated with the database server.

13. The non-transitory computer-readable storage medium of claim 12, wherein the particular value is stored as a row written to a table of the database.

14. The non-transitory computer-readable storage medium of claim 12, wherein the function is disposed within the database or the database server.

15. The non-transitory computer-readable storage medium of claim 12, wherein the database comprises an end tier of an application computing environment that has two or more tiers and wherein the sending of the statement to the database server is performed by an application executing from a tier of the computing environment other than the database.

16. The non-transitory computer-readable storage medium of claim 11, wherein the function is invoked upon processing the application input string.

17. The non-transitory computer-readable storage medium of claim 11, wherein the statement comprises a statement in Structured Query Language (SQL), Procedural Language/SQL (PL/SQL), or a database language that performs one or more functions of SQL or PL/SQL.

18. The non-transitory computer-readable storage medium of claim 11, wherein the particular value comprises an audit record of a vulnerability of the application to SQL injection.

19. The non-transitory computer-readable storage medium of claim 1, wherein the application input string comprises a SQL injection attack string.

20. The non-transitory computer-readable storage medium of claim 11, wherein the function, when executed, returns a null value to the application.

* * * * *